C. M. KLINE.
HERMETICALLY SEALED BOTTLE.
APPLICATION FILED APR. 23, 1914.
1,138,764.
Patented May 11, 1915.
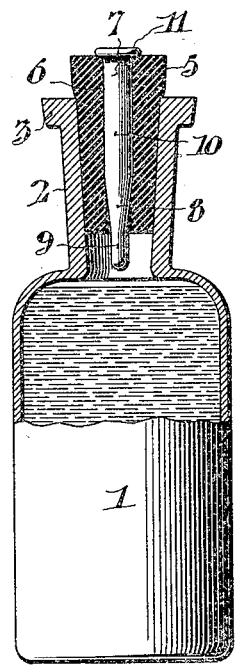
Inventor
Clarence Mahlon Kline,
Witnesses

UNITED STATES PATENT OFFICE.

CLARENCE M. KLINE, OF PHILADELPHIA, PENNSYLVANIA, ASSIGNOR TO SMITH, KLINE & FRENCH CO., OF PHILADELPHIA, PENNSYLVANIA, A CORPORATION OF PENNSYLVANIA.

HERMETICALLY-SEALED BOTTLE.

1,138,764.  Specification of Letters Patent.  Patented May 11, 1915.

Application filed April 23, 1914.  Serial No. 833,848.

*To all whom it may concern:*

Be it known that I, CLARENCE MAHLON KLINE, of Philadelphia, in the county of Philadelphia and State of Pennsylvania, have invented certain new and useful Improvements in Hermetically-Sealed Bottles, whereof the following is a specification, reference being had to the accompanying drawings.

My invention relates to a bottle, which after filling, may be hermetically sealed by a closure which is not difficult to remove, and which may serve as a useful closure even after the seal has been broken.

I have found this invention especially useful in the packaging and preservation *in vacuo* of certain drugs which deteriorate when exposed to the air, but its utility is not thus limited. To this end I provide the neck of a bottle with a ground glass entrance, and further provide an axially pierced rubber cork, projecting above the lip of the bottle sufficiently to afford a grasping surface. A glass plug fits within the pierced axis of the rubber cork, and so expands it, by its insertion, so as to render the joint air-tight, although not interfering with the removal of the stopper as a whole, by grasping and twisting the protruding end of the rubber cork with the fingers.

Referring to the accompanying drawings, 1, is a suitable glass receptacle, provided with a neck 2, and lip 3. The neck and lip are interiorly ground, in the form of an inverted cone, to provide a true surface for insertion of the closure. In order to render this part of the bottle capable of resisting considerable interior pressure, both the neck and the lip may be made of glass of unusual thickness, as shown in the drawing.

A rubber cork 5, has a conical exterior surface, which fits accurately within the ground interior of the lip and neck of the bottle. This rubber cork is of sufficient length to protrude a convenient distance above the lip of the bottle after it has been firmly seated within the neck, so that the protruding end affords convenient length for grasping by the fingers for removal of the stopper.

The rubber cork is pierced axially from top to bottom, with formation of the small cylindrical aperture 6. Within this aperture is inserted a glass plug 7. This plug has an upper cylindrical portion 10, an intermediate tapered portion 8, and a smaller cylindrical depending portion 9, the function of which will be described later. The upper cylindrical part 10, is of such diameter that its insertion within the pierced axis of the rubber cork effects a considerable expansion of the cork. The plug 7, is provided at its upper end with a small flat head 11, capable of lying closely against the top of the rubber cork, and embedding itself slightly therein, so that the top of this head lies in substantially the same plane as the top of the cork, and affords no obstacle toward the firm grasping of the upper end of the cork by the fingers, in order to remove it from the bottle. It is so small and lies so close to the cork as to repel any attempt to open the bottle by removal of the glass plug from the rubber cork, the intention being that after the sealing of the bottle the glass plug shall remain permanently within the rubber cork, the two together forming a useful stopper so long as the receptacle remains in use after the breaking of the seal which necessarily occurs when it is first used.

In operation the bottle having been filled is placed in a receptacle from which the air may be exhausted with the rubber cork forced strongly within the neck of the bottle, and with the glass plug resting within its upper end merely of its own weight. The tapered portion 7, prevents the weight of the plug from forcing the plug down into the cork and the depending extremity 9, centers the plug in place, so that it remains in its seat although not yet forced into the interior of the cork. With the parts in this relation, the air surrounding the bottle is exhausted so as to create as nearly as may be a vacuum in the top of the bottle. A sufficient vacuum having been obtained, the glass plug is forced all the way down within the rubber cork without breaking the vacuum surrounding it. The bottle is then removed from the vacuum and will remain for a long time hermetically sealed. The combination of the ground interior of the neck of the bottle, the conical rubber cork, and the expanding interior glass plug produces a very tight joint. In this condition, the contents of the bottle are marketed, and when the time comes to make use of the contents or any part of them, the purchaser has no difficulty in opening the bottle and breaking the vacuum by merely grasping and twisting the protruding end of the rubber cork, for as above explained, the glass plug with its small flat head affords no convenient surface for an attempt to open the bottle while removing it (which is undesirable), it being intended that the plug shall always thereafter remain in the center of the rubber cork. After the seal has been broken, the cork is still a perfectly practical one for successive closing of the bottle, until its contents have been exhausted.

Having thus described my invention, I claim:

1. In an hermetically sealed bottle, the combination of a rubber cork fitting the neck of the bottle with sufficient protrusion of the upper end to permit its being grasped for removal, said cork being pierced axially from top to bottom; and a glass plug inserted within said pierced cork to expand it and tighten its fit in the neck of the bottle, said plug having its head flattened so that the top of the plug lies in substantially the same plane as the top of the cork, substantially as and for the purpose described.

2. In an hermetically sealed bottle, the combination of a rubber cork fitting the neck of the bottle with sufficient protrusion of the upper end to permit its being grasped for removal; said cork being pierced axially from top to bottom; and a glass plug inserted within said pierced cork to expand it and tighten its fit in the neck of the bottle, said plug having its head flattened and lying close to the plane of the top of the cork, the diameter of said head being smaller than that of the top of the cork substantially as and for the purpose described.

3. In an hermetically sealed bottle, the combination of a rubber cork fitting the neck of the bottle and pierced axially from top to bottom; and a glass plug capable of insertion within said pierced cork to expand it and tighten its fit in the neck of the bottle, said plug having its head flattend so that the top of the plug lies in substantially the same plane as the top of the cork, and also having an upper cylindrical portion, an intermediate tapered portion and a lower smaller cylindrical portion.

In testimony whereof, I have hereunto signed my name, at Philadelphia, Pennsylvania, this twenty-first day of April, 1914.

CLARENCE M. KLINE.

Witnesses:
JAMES H. BELL,
E. L. FULLERTON.